United States Patent
MacKiewich et al.

(10) Patent No.: US 7,088,674 B2
(45) Date of Patent: Aug. 8, 2006

(54) METHOD AND APPARATUS FOR CHECKING CONTINUITY OF LEAF-TO-ROOT VLAN CONNECTIONS

(75) Inventors: Blair T. MacKiewich, Surrey (CA); Yuming Wen, Delta (CA); Gregory S. Cooper, Port Moody (CA)

(73) Assignee: Alcatel Canada Inc., Kanata (CA)

( * ) Notice: Subject to any disclaimer, the term of this patent is extended or adjusted under 35 U.S.C. 154(b) by 913 days.

(21) Appl. No.: 10/026,713

(22) Filed: Dec. 27, 2001

(65) Prior Publication Data

US 2004/0223463 A1    Nov. 11, 2004

(51) Int. Cl.
  *G01R 31/08* (2006.01)
  *G06F 11/00* (2006.01)
  *H04L 12/26* (2006.01)

(52) U.S. Cl. .............. 370/225; 370/241.1; 370/245; 370/256; 714/25

(58) Field of Classification Search .............. 370/216, 370/225, 241–242, 245, 217, 221, 256; 375/224; 714/25, 48

See application file for complete search history.

(56) References Cited

U.S. PATENT DOCUMENTS

| | | | | |
|---|---|---|---|---|
| 5,289,460 A | * | 2/1994 | Drake et al. ............... | 370/245 |
| 5,799,003 A | * | 8/1998 | Fujimaki et al. ......... | 370/241.1 |
| 5,878,232 A | * | 3/1999 | Marimuthu ............... | 709/249 |
| 5,901,141 A | | 5/1999 | Gruber et al. | |
| 6,041,037 A | * | 3/2000 | Nishio et al. ............ | 370/228 |
| 6,181,680 B1 | | 1/2001 | Nagata et al. | |
| 6,304,546 B1 | * | 10/2001 | Natarajan et al. ......... | 370/216 |
| 6,311,288 B1 | * | 10/2001 | Heeren et al. .............. | 714/4 |
| 6,353,593 B1 | * | 3/2002 | Chen et al. ............... | 370/216 |
| 2003/0112749 A1 | * | 6/2003 | Hassink et al. ............ | 370/225 |

FOREIGN PATENT DOCUMENTS

| EP | 0 975 199 A2 | 1/2000 |
|---|---|---|
| EP | 1 333 624 A3 | 8/2003 |

OTHER PUBLICATIONS

D. Ruffen, T. Len, and J. Yanacek, Cabletron Systems Incorporated, Cabletron's SecureFast VLAN Operation Model. RFC 2643, pp. 1-19, Aug. 1999.*

(Continued)

*Primary Examiner*—Chau Nguyen
*Assistant Examiner*—Kerri M. Dyke
(74) *Attorney, Agent, or Firm*—Oyen Wiggs Green & Mutala LLP

(57) ABSTRACT

A virtual LAN (VLAN) has a number of segments connected by connections in a connection-oriented network. The topology of the VLAN is defined by a spanning tree. Cell sources on the connections send continuity checking cells in a direction toward the spanning tree root to corresponding cell sinks. The cell sinks can trigger a change in the topology of the VLAN if the reception of continuity checking cells is interrupted. The connection-oriented network may be an ATM network. The continuity checking cells may be OAM cells.

37 Claims, 2 Drawing Sheets

OTHER PUBLICATIONS

D. Hamilton and D. Ruffen, Cabletron Systems Incorporated, Cabletron's VlanHello Protocol Specification Version 4. RFC 2641, pp. 1-7, Aug. 1999.*

L. Kane, Cabletron Systems Incorporated, Cabletron's VLS Protocol Specification. RFC 2642, pp. 1-6, Aug. 1999.*

International Telecommunication Union, *Integrated Services Digital Network (ISDN) Maintenance Principles; B-ISDN Operation and Maintenance Principles and Functions.* 1.610 Nov. 1995.

*IEEE Standards for Local and Metropolitan Area Networks: Virtual Bridged Local Area Networks*, Institute of Electrical and Electronics Engineers, Inc. Mar. 8, 1999.

*IEEE Standard for Information Technology: Part 5: Remote Media Access Control (MAC) Bridging*; Institute of Electrical and Electronics Engineers, Inc. 1998.

* cited by examiner

METHOD AND APPARATUS FOR CHECKING CONTINUITY OF LEAF-TO-ROOT VLAN CONNECTIONS

TECHNICAL FIELD

The invention relates to data communication networks. The invention relates specifically to checking continuity of connections made across a connection-based network. The connection-based network could be a cell relay network such as an ATM network or a multi protocol label switching (MPLS) network. The invention has application in providing fault tolerance in virtual LANs (VLANs) in which data is carried over a connection-based network.

BACKGROUND

In this disclosure the term virtual LAN ("VLAN") means a data communication network which comprises a number of segments which are connected together by links which operate according to a networking protocol different from that of the network segments. For example, two segments of an ethernet network may be connected by way of a connection in a connection-based network. The connection may be, for example, a virtual circuit in an asynchronous transfer mode (ATM) network or a path in an MPLS network. Each of the network segments may be interfaced to the connection-based network by a bridge.

Data may be delivered between the segments in any of a wide number of ways. For example, where the segments comprise ethernet segments and the network which connects the segments comprises an ATM network, then ethernet frames may be carried between the segments according to standards such as local area network emulation ("LANE"), multi-protocol over ATM ("MPOA") or IP over ATM. The particular format by which data is conveyed between network segments is not important to this invention.

The topology of a VLAN is typically initially established using a protocol such as the spanning tree protocol (STP). STP generates a network topology which is defined by a spanning tree. The spanning tree defines a topology which does not include any loops. After the topology has been established, a bridge at a root of the spanning tree generates and sends toward the leaves of the spanning tree bridge protocol data units BPDUs. If a bridge at a leaf in the spanning tree fails to receive a BPDU within a defined time period, the bridge can trigger a request for a topology change. If a new path to the bridge exists then the topology change will incorporate the new path into the network.

IEEE standard 802.1Q provides a set of capabilities which permit media access control (MAC) bridges to define and manage networks in which multiple broadcast domains can co-exist on a single physical medium. This IEEE standard uses the term "VLAN" to describe such networks. In this disclosure the term VLAN is not used in the same sense as it is in IEEE 802.1Q (although this invention may be applied to networks which operate, or which include portions which operate, according to IEEE 802.1Q). IEEE standard 802.1D describes the operation of MAC bridges.

There are various standards applicable to ATM networks in which operations, administration, and management ("OAM") cells are used for monitoring connections within the ATM network. These include Bellcore UNI specification 3.1 and ITU-I.610.

U.S. Pat. No. 6,181,680 describes a method for testing ATM networks using OAM cells.

U.S. Pat. No. 5,901,141 discloses a method for identifying those nodes passed through by a virtual connection which joins two end nodes. The method sends trace cells downstream from a monitoring node toward an endpoint. Each downstream node either loops back a trace cell identifying itself to the monitoring node or forwards the trace cell further.

There exists a need for cost-effective methods and apparatus for providing fault tolerance mechanisms in VLANs.

SUMMARY OF THE INVENTION

The invention provides methods and apparatus for monitoring the continuity of the connections in a connection-based network which connect plural segments of a virtual LAN. One aspect of the invention provides a method for providing fault tolerance in a VLAN having a topology defined by a spanning tree having a root node and at least one leaf node. The root and leaf nodes are interconnected by connections in a connection-based network. The method comprises: sending from a first node in a connection used by the VLAN, in a leaf-to-root direction a series of continuity checking cells; detecting the continuity checking cells at a second node in the connection wherein the second node is located between the first node and the root node; and, generating a request for a change in the topology of the VLAN in response to not receiving one or more continuity checking cells at the second node.

The method may include generating a spanning tree protocol topology change notification. In some embodiments the request for a change in the topology of the VLAN may result in the generation of a connection rerouting request.

The segments may comprise ethernet segments. The connection-based network may comprise an ATM network. The continuity checking cells may comprise OAM cells.

Another aspect of the invention provides a method for rerouting a connection in a connection-based network where the connection carries data traffic between ethernet segments of a VLAN. The method comprises: configuring nodes at first and second ends of the connection respectively to source and sink continuity checking cells; sending continuity checking cells at a specified rate from the node at the first end of the connection; receiving the continuity checking cells at a cell sink at the node at the second end of the connection; generating a request for a change in topology of the VLAN in response to the cell sink not receiving a predetermined number of the continuity checking cells; generating a reroute signal for the connection in response to the request for a change in topology of the VLAN and, rerouting the connection through the connection-based network in response to the reroute signal.

In some embodiments, determining that the cell sink has not received a predetermined number of the continuity checking cells comprises determining that a time elapsed since receipt of a most recently received one of the continuity checking cells exceeds a threshold time.

A further aspect of the invention provides a method for providing fault tolerance in an ethernet VLAN comprising a plurality of ethernet segments connected to an ATM network by bridges and an ATM virtual circuit extending between a first one of the bridges and a second one of the bridges. The method comprises: configuring nodes at first and second ends of the virtual circuit respectively to source and sink OAM continuity checking cells; sending from a source port at the first end of the virtual circuit OAM continuity checking cells at a specified rate; receiving the OAM continuity checking cells at a sink port at the second end of the virtual circuit; and, generating an action request in response to the sink port determining that it has not received a number of the OAM continuity checking cells.

Another aspect of the invention provides a virtual LAN having a topology defined by a spanning tree. The virtual LAN comprises: a plurality of network segments each bridged to a connection-oriented network; a plurality of connections in the connection-based network, the connections interconnecting the plurality of network segments; a cell source located on a first one of the connections, the cell source configured to generate and send on the connection temporally spaced apart continuity checking cells in a direction toward a root of the spanning tree; and, a cell sink located on the first one of the connections at a location between the cell source and the root of the spanning tree. The cell sink is configured to receive the continuity checking cells and to trigger an alarm condition in response to not receiving one or more of the continuity checking cells sent by the cell source. Optionally continuity checking cells may also be sent on the first one of the connections in a direction toward a leaf of the spanning tree. The continuity checking cells may be sent in the root-to-leaf direction at a rate higher than a rate at which BPDUs are sent in the root-to-leaf direction.

Further aspects of the invention and features of specific embodiments of the invention are described below.

BRIEF DESCRIPTION OF THE DRAWINGS

In drawings which illustrate non-limiting embodiments of the invention.

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

Figure 1:
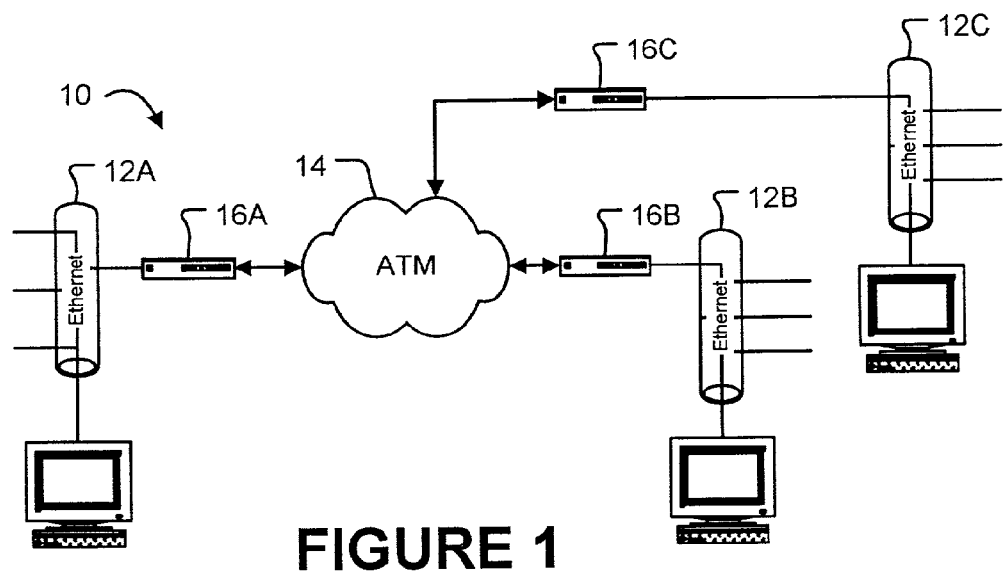
FIG. 1 is a schematic diagram of a network having a number of ethernet segments connected by cell relay connections.

FIG. 1 illustrates a simple network 10. Network 10 has three segments 12A, 12B and 12C. The segments may comprise broadcast-based networks, such as ethernet segments. Segments 12A, 12B, and 12C are connected by a connection-based network 14 to provide a VLAN. The connection-based network may comprise, for example, a cell relay network which could be an asynchronous transfer mode ("ATM") network, a multi-protocol label switching ("MPLS") network, or the like. Segments 12 are each bridged to the connection-based network. Bridges 16A, 16B and 16C (collectively bridges 16) respectively provide interfaces between ethernet segments 12A, 12B and 12C and connection-based network 14.

The VLAN may include a mechanism for providing fault-tolerance at the VLAN level. For example, a bridge 16 at a root of a spanning tree which defines a topology for network 10 may send BPDUs to bridges 16 at leaves of the spanning tree. Upon failing to receive an expected BPDU the bridge 16 at a leaf of the spanning tree may trigger a network reconfiguration. The network reconfiguration may be triggered by the bridge 16 sending a topology change notification to another bridge 16 at the root of the spanning tree.

The connection-based network may comprise a cell relay network, as illustrated in FIG. 1. Cell relay network 14 may comprise, for example, an ATM network.

Figure 2:
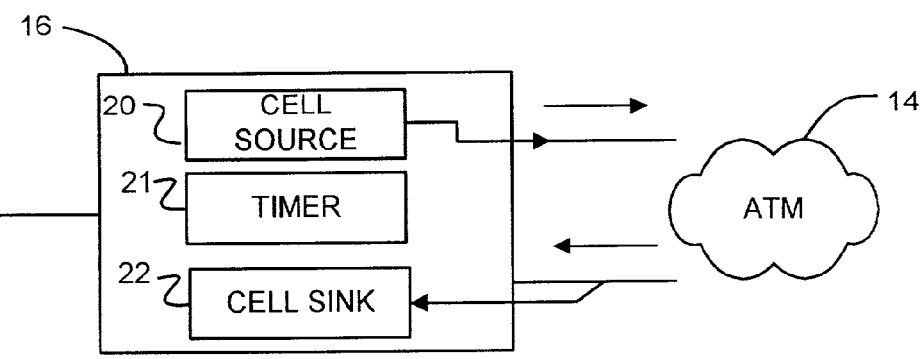
FIG. 2 is a block diagram illustrating apparatus according to an embodiment of the invention.

As shown in FIG. 2, in one embodiment of the invention, each bridge 16 comprises a packet source 20 and a packet sink 22. The term "packet source" is used herein to mean a source of packets, which may comprise cells or fixed or variable length data frames of other types. The term "packet sink" is used herein to mean a sink for packets sourced at a packet source. Packet source 20 can generate a series of continuity checking (CC) packets at a specified rate. In the illustrated embodiment of the invention, packet source 20 comprises a cell source, packet sink 22 comprises a cell sink and the CC packets comprise CC cells.

The CC cells may be generated at a suitable rate which may be, for example, in the range of one cell per 5 seconds to one cell per 0.1 second. In certain implementations the rate may be one cell per second. A timer 21 associated with cell source 20 provides a signal used by cell source 20 to generate and send CC cells at spaced apart times. Timer 21 may be integrated with cell source 20 or may comprise a separate timer accessible to cell source 20. Cell sinks 22 and cell sources 20 may be located at nodes in cell relay network 14 other than bridges 16.

Where the connection-based network comprises an ATM network, the cells generated by cell source 20 may be operations, administration, and management ("OAM") cells. Cell sink 22 receives CC cells inserted by a cell source 20.

A cell sink 22 may be configured to monitor for the CC cells from a cell source 20. Cell sink 22 includes or is associated with a mechanism which is configured to trigger an alarm condition if a specified number of expected CC cells are missed or, equivalently, if a specified time elapses after the detection of an CC cell without another CC cell being detected. Cell sink 22 is also associated with a timer. Where a single device hosts both a cell source 20 and a cell sink 22 the same timer 21 may be used by both cell source 20 and cell sink 22. In the alternative, separate timers may be provided.

Cell sink 22, or another component which detects the alarm condition, may trigger a request which results in the affected connection being bypassed. The request may comprise a request to a VLAN-level fault tolerance mechanism. The request may result in the rerouting of the affected connection (i.e. the request may result in a VC reroute signal being generated, for example, the request may cause the VLAN to generate a soft permanent virtual connection ("SPVC") reroute request). The use of SPVC reroute requests to repair failed virtual circuits is discussed in commonly-owned U.S. patent application Ser. No. 09/821, 708 entitled METHOD AND APPARATUS FOR REROUTING A CONNECTION IN A DATA COMMUNICATION NETWORK BASED ON A USER CONNECTION MONITORING FUNCTION which is hereby incorporated by reference. The request may also comprise a request which results in the network topology being reconfigured (this may, for example, take the form of a STP topology change notification or equivalent, or a request that VLAN data currently being carried by way of a particular bridge port be carried instead by an auxiliary bridge port).

Cell sources 20 and cell sinks 22 may be implemented as software processes executed by a suitable data processor, as hardware devices, or as a combination of hardware and software. Cell sources 20 and cell sinks 22 may be implemented, for example, by circuits provided in an application specific integrated circuit ("ASIC") or field programmable gate array ("FPGA").

At least some of the cell sinks 22 are located at nodes in cell relay network 14 which cells reach from corresponding cell sources 20 by travelling toward the root of a spanning tree which defines the topology of a VLAN (i.e. by travelling in a leaf-to-root direction). The cell sources may be located at leaf nodes of the spanning tree and/or at other nodes along the connections through which data flows on its way from the leaf nodes to the root node of the spanning tree. The cell sinks are located on the connections between the corresponding cell source and the root of the spanning tree. In this disclosure "between the corresponding cell source and the root of the spanning tree" includes locations at the root of the spanning tree. In some embodiments of the invention the CC cells are generated at a leaf node of a spanning tree which defines a VLAN and are detected at a root node of the spanning tree.

It may be desirable in many cases, but is not necessary in all implementations of the invention, that the cell sources 20 and cell sinks 22 be arranged so that continuity checking packets travel over the full length of all connections included in the topology of the VLAN. The invention could be used to detect faults in a subset of the connections used by a VLAN or to detect faults which may occur in one or more selected segments of one or more connections used by the VLAN.

Cell sources 20 and corresponding cell sinks 22 may also be located at nodes in cell relay network 14 such that continuity checking cells from the cell sources 20 travel along the connections used by the VLAN toward leaves of the spanning tree (i.e. in a root-to-leaf direction). Such continuity checking cells may be generated at a rate higher than any BPDUs which may be sent from the root of the spanning tree to the leaves of the spanning tree as part of a VLAN-level fault tolerance mechanism.

Figure 3:
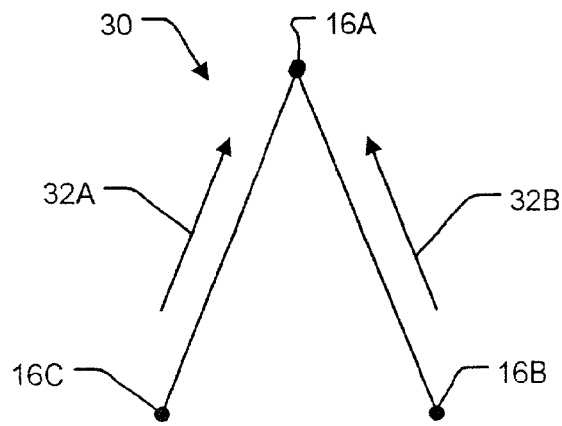
FIG. 3 is a diagram illustrating a spanning tree for a network having a very simple topology; and, FIG. 4 is a flow chart illustrating a method according to an embodiment of the invention.

In the example embodiment of FIG. 3, the topology of a VLAN is defined by a spanning tree 30 having a root at bridge 16A and leaves at bridges 16B and 16C. Cell sources at bridges 16B and 16C source CC cells which travel in leaf-to-root directions as indicated by arrows 32A and 32B to a cell sink 22 (or multiple cell sinks 22) at bridge 16A.

Figure 4:
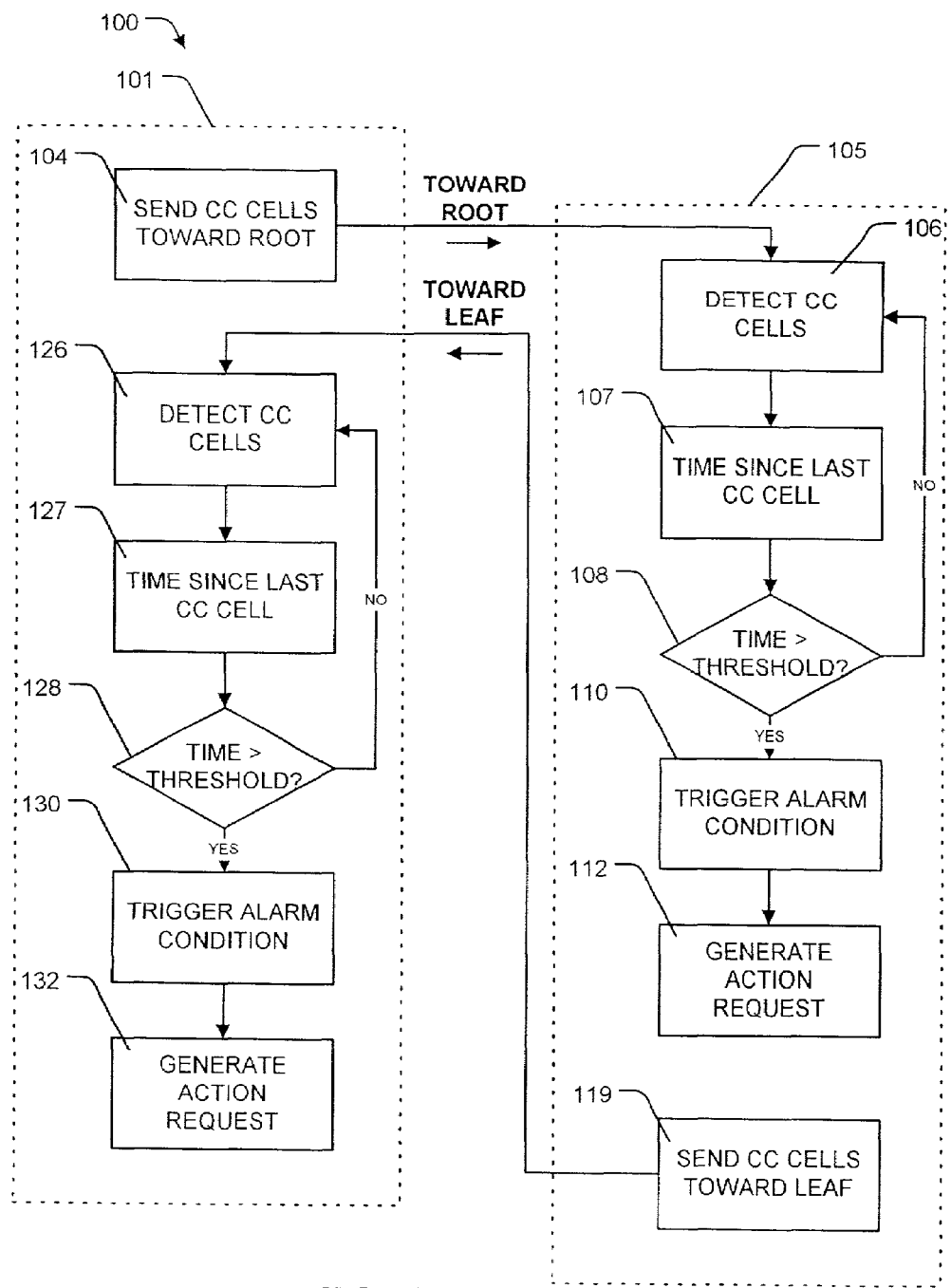

The invention provides a method for monitoring continuity of connections in a VLAN. As shown in FIG. 4, the method 100 comprises, at a bridge connecting a VLAN segment to a cell relay network, generating and sending over a connection used by the VLAN toward a root node of a spanning tree for the VLAN a series of continuity checking (CC) cells (block 104). The CC cells may be sent continuously at a rate in the range of, for example, once per 1/10 second to once per 5 seconds. The rate at which the CC cells is sent is preferably in the range of once per 1/2 second to once per 2 seconds. In a currently preferred embodiment of the invention the CC cells are sent at a rate of approximately once per second.

CC cells may be sent at a higher rate to permit faster fault recovery. Sending CC cells at a higher rate consumes bandwidth. For each application a tradeoff between bandwidth consumed and the maximum time for detecting a loss of connectivity in the leaf-to-root direction may be achieved by selecting a suitable rate for sending the CC cells.

In block 106 the CC cells are detected at an end of the connection. As long as the CC cells continue to be detected at the end of the connection it is known that the connection is transmitting cells. The time since receipt of the last CC cell is monitored in block 107. If the time exceeds a threshold as determined in block 108 then an alarm condition is triggered in block 110. Triggering the alarm condition may comprise generating an action request (block 112). The action request may comprise a request to a VLAN-level fault tolerance mechanism. The action request may comprise, for example, a topology change request or a request that the broken connection be rerouted.

Where the action request comprises a topology change request, the topology change request may comprise a BPDU. The BPDU may be issued to a bridge at the root node and may be of the same nature as the BPDU which would be issued by a leaf-node upon loss of connectivity to a bridge at the root node.

The actions of all of the blocks indicated by reference numeral 101 (which include block 104 and blocks 126 to 132) may be performed in a device at the location where the CC cells are detected in block 126. The actions of all of the blocks indicated by reference numeral 105 (which include block 106 and blocks 107 to 112) may be preformed in a device at the location where the CC cells are detected in block 106.

Method 100 may also monitor continuity of the connection in a direction away from the root of the spanning tree as shown in FIG. 4. In block 119 a second set of CC cells are generated and dispatched from the node at which CC cells are received in block 106 toward the root. The second set of CC cells may be sent at the same or a similar rate to the first set of CC cells. In block 126 the CC cells of the second set of are detected at an end of the connection. The second set of CC cells may be detected, for example, at the same node at which the first set of CC cells originates. As long as the CC cells of the second set of CC cells continue to be detected at the end of the connection it is known that the connection is transmitting cells. The time since receipt of the last CC cell is monitored in block 127. If the time exceeds a threshold as determined in block 128 then an alarm condition is initiated in block 130. Upon the alarm condition being triggered, an action request may optionally be generated (block 132). The action request may comprise, for example, a topology change request or a connection rerouting request. Where a VLAN comprises a plurality of connections extending through one or more cell relay networks, method 100 may be applied to any or all of the connections.

Method 100 provides a method for detecting a broken leaf-to-root path even in cases where a corresponding root-to-leaf path is not broken. Method 100 further provides a way to avoiding the deleterious effects of broken leaf-to-root paths.

Detecting the failure of a connection may be performed in various ways. For example, the method described above checks to determine if the time since a last CC cell was received exceeds a threshold time. The threshold time may be chosen such that an alarm condition is triggered only if N sequential CC cells are not received at the location at which block 106 is performed. N is a number which may be, for example, in the range of 1 to 10, and is preferably in the range of 3 to 6.

Another method for detecting the failure of a connection is to maintain a count of the number of missed CC cells within a window having a given duration. If more than a threshold number of CC cells have been missed within the window then the alarm condition may be triggered. For example, where CC cells are sent at a rate of 1 per second to a cell sink 22 and all of the CC cells are received then cell sink would receive 5 or 6 cells within a 5½ second window. If the number of cells received within the window falls below a threshold then the alarm condition may be triggered.

Those skilled in the art will appreciate that the methods and apparatus of this invention may be applied to internetworking bridged LAN fault tolerance mechanisms with the fault tolerance mechanisms provided by a connection-based network over which data in the bridged LAN is carried.

Certain implementations of the invention comprise computer processors which execute software instructions which cause the processors to perform a method of the invention. The invention may also be provided in the form of a program product. The program product may comprise any medium which carries a set of computer-readable signals comprising instructions which, when executed by a computer processor, cause the data processor to execute a method of the invention. The program product may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like or transmission-type media such as digital or analog communication links.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

As will be apparent to those skilled in the art in the light of the foregoing disclosure, many alterations and modifications are possible in the practice of this invention without departing from the spirit or scope thereof. For example:

While it is convenient in an ATM network to format the CC packets as OAM cells, other types of cells could be used in place of the OAM cells;

where the connection-based network comprises another type of network such as an MPLS network, the CC packets may comprise frames sent between nodes along a path along which data for a VLAN is carried in the connection-based network.

Accordingly, the scope of the invention is to be construed in accordance with the substance defined by the following claims.

What is claimed is:

1. A method for providing fault tolerance in a VLAN having a topology defined by a spanning tree having a root node and at least one leaf node, the root and leaf nodes interconnected by connections in a connection-based network, the method comprising:
   sending from a first node in a connection used by the VLAN, in a leaf-to-root direction a series of continuity checking packets;
   detecting the continuity checking packets at a second node in the connection wherein the second node is the root node or is located between the first node and the root node, the connection passing through at least one intermediate node between the first and second nodes; and,
   generating a request for a change in the topology of the VLAN in response to not receiving one or more continuity checking packets at the second node.

2. The method of claim 1 comprising generating a connection rerouting request in response to the request for a change in the topology of the VLAN.

3. The method of claim 1 wherein generating a request for a change in the topology of the VLAN comprises generating a topology change notification.

4. The method of claim 1 wherein the first node is at a leaf of the spanning tree.

5. The method of claim 4 wherein the second node is at a root of the spanning tree.

6. The method of claim 1 wherein the connection-based network comprises an ATM network and sending a series of continuity checking packets comprises sending a series of CAM cells.

7. The method of claim 1 comprising monitoring a time elapsed since receipt of a continuity checking packet at the second node and generating the request for a change in the topology of the VLAN if the time elapsed exceeds a threshold.

8. The method of claim 1 comprising monitoring a number of continuity checking packets received at the second node within a time window and generating the request for a change in the topology of the VLAN if the number of continuity checking packets received at the second node is less than a threshold number.

9. The method of claim 1 also comprising sending continuity checking packets from the root node to one or more leaf nodes of the spanning tree and detecting the continuity checking packets at the one or more leaf nodes of the spanning tree.

10. A method for providing fault tolerance in a VLAN having a topology defined by a spanning tree having a root node and at least one leaf node, the root and leaf nodes interconnected by connections in a connection-based network, the method comprising:
    sending from a first node in a connection used by the VLAN, in a leaf-to-root direction a series of continuity checking packets;
    detecting the continuity checking packets at a second node in the connection wherein the second node is the root node or is located between the first node and the root node; and,
    generating a request for a change in the topology of the VLAN in response to not receiving one or more continuity checking packets at the second node
    wherein the connection-based network comprises an ATM network, and sending a series of continuity checking packets comprises sending a series of OAM cells at intervals in the range of ½ second to 2 seconds.

11. The method of claim 10 comprising generating a connection rerouting request in response to the request for a change in the topology of the VLAN.

12. The method of claim 10 wherein generating a request for a change in the topology of the VLAN comprises generating a topology change notification.

13. The method of claim 10 wherein the first node is at a leaf of the spanning tree.

14. The method of claim 13 wherein the second node is at a root of the spanning tree.

15. The method of claim 10 comprising monitoring a time elapsed since receipt of a continuity checking packet at the second node and generating the request for a change in the topology of the VLAN if the time elapsed exceeds a threshold.

16. The method of claim 10 comprising monitoring a number of continuity checking packets received at the second node within a time window and generating the request for a change in the topology of the VLAN if the number of continuity checking packets received at the second node is less than a threshold number.

17. A method for providing fault tolerance in an ethernet VLAN comprising a plurality of ethernet segments connected to an ATM network by bridges and an ATM virtual circuit extending between a first one of the bridges and a second one of the bridges, the method comprising:
configuring nodes at first and second ends of the virtual circuit respectively to source and sink OAM continuity checking cells;
sending from a source port at the first end of the virtual circuit OAM continuity checking cells at a rate of at least one QAM continuity checking cell per 2 seconds;
receiving the QAM continuity checking cells at a sink port at the second end of the virtual circuit; and,
generating a request for a change in the topology of the VLAN in response to the sink port determining that it has not received a number of the OAM continuity checking cells.

18. The method of claim 17 comprising generating a signal to trigger a soft permanent virtual circuit reroute in response to the request for a change in the topology of the VLAN.

19. The method of claim 17 wherein generating a request for a change in the topology of the VLAN comprises generating a spanning tree protocol topology change notification.

20. The method of claim 19 wherein generating a request for a change in the topology of the VLAN comprises sending a BPDU to a node of the VLAN.

21. The method of claim 19 wherein generating a request for a change in the topology of the VLAN comprises sending a BPDU to a root node of the VLAN.

22. The method of claim 17 wherein the sink port is at a root node of the VLAN, the source port is at a leaf node of the VLAN and the QAM continuity checking cells travel over the connection in a leaf-to-root direction.

23. The method of claim 17 wherein the VLAN comprises a plurality of segments interconnected in a topology defined by a spanning tree protocol having a root at the second end of the virtual circuit and a leaf at the first end of the virtual circuit.

24. The method of claim 17 comprising determining that the sink port has not received a predetermined number of the QAM continuity checking cells by determining that a time elapsed since receipt of a most recently received one of the QAM continuity checking cells exceeds a threshold time.

25. A method for rerouting a connection in a connection-based network, the connection carrying data traffic between ethernet segments of a VLAN, the method comprising:
configuring nodes at first and second ends of the connection respectively to source and sink continuity checking packets;
sending continuity checking packets at a specified rate from the node at the first end of the connection;
allowing the continuity checking packets to pass along the connection through at least one intermediate node between the node at the first end of the connection and the node at the second end of the connection;
receiving the continuity checking packets at a packet sink at the node at the second end of the connection;
generating a request for a change in the topology of the VLAN in response to the packet sink not receiving a predetermined number of the continuity checking packets;
generating a reroute signal for the connection in response to the request for a change in the topology of the VLAN; and,
rerouting the connection through the connection-based network in response to the reroute signal.

26. The method of claim 25 wherein the connection-based network comprises an ATM network and the continuity checking packets comprise OAM cells.

27. The method of claim 26 comprising determining that the cell sink has not received a predetermined number of the OAM cells by determining that a time elapsed since receipt of a most recently received one of the OAM cells exceeds a threshold time.

28. The method of claim 27 wherein the connection comprises a soft permanent virtual circuit and the reroute signal comprises a VC reroute signal.

29. The method of claim 25 wherein the VLAN comprises a plurality of segments interconnected in a topology defined by a spanning tree protocol having a root at the second end of the connection and a leaf at the first end of the connection.

30. The method of claim 29 wherein the spanning tree comprises a plurality of leaves and the method comprises generating the continuity checking packets at each of the plurality of leaves of the spanning tree.

31. The method of claim 30 comprising receiving the continuity checking packets from the plurality of leaves of the spanning tree at corresponding packet sinks located at the root of the spanning tree.

32. The method of claim 31 comprising triggering a VLAN-level fault tolerance mechanism in response to not receiving one or more of the continuity checking packets at the corresponding packet sink.

33. The method of claim 31 wherein the root of the spanning tree is located at a bridge and the bridge generates and sends bridge protocol data units to other bridges located at the leaves of the spanning tree.

34. A method for providing fault tolerance in a VLAN having a topology, the VLAN comprising a plurality of segments interconnected by connections in an ATM network the method comprising:
at a cell source on one of the connections generating a series of continuity checking cells;
at a cell sink on the one of the connections receiving the continuity checking cells;
between generating the continuity checking cells and receiving the continuity checking cells, allowing the continuity checking cells to pass along the one of the connections through at least one intermediate node on the one of the connections, the intermediate node between the cell source and the cell sink;
determining that a number of the continuity checking cells sent by the cell source have not been received at the cell sink;
generating a fault indication in response to determining that a number of the continuity checking cells have not been received at the cell sink; and,
triggering a change in the topology of the VLAN in response to the fault indication.

35. The method of claim 34 wherein the continuity checking cells comprise OAM cells.

36. The method of claim 35 comprising generating and sending the OAM cells at equally spaced-apart times.

37. The method of claim 36 comprising generating the fault indication when a time longer than a threshold time has passed since the cell sink has received one of the OAM cells.

* * * * *